(12) United States Patent
Taneja

(10) Patent No.: US 7,647,417 B1
(45) Date of Patent: Jan. 12, 2010

(54) OBJECT CACHEABILITY WITH ICAP

(75) Inventor: Manik Taneja, Amstelveen (NL)

(73) Assignee: NetApp, Inc., Sunnyvale, CA (US)

( * ) Notice: Subject to any disclaimer, the term of this patent is extended or adjusted under 35 U.S.C. 154(b) by 527 days.

(21) Appl. No.: 11/376,439

(22) Filed: Mar. 15, 2006

(51) Int. Cl.
*G06F 15/16* (2006.01)
*G06F 13/28* (2006.01)

(52) U.S. Cl. .................. 709/230; 709/246; 711/133

(58) Field of Classification Search ........... 709/230; 711/133
See application file for complete search history.

(56) References Cited

U.S. PATENT DOCUMENTS

| | | | |
|---|---|---|---|
| 6,173,291 | B1 | 1/2001 | Jenevein |
| 6,442,651 | B2* | 8/2002 | Crow et al. ............... 711/118 |
| 6,983,296 | B1 | 1/2006 | Muhlestein et al. |
| 7,237,239 | B1* | 6/2007 | Goel et al. ............... 717/170 |
| 7,269,620 | B2 | 9/2007 | Bes et al. |
| 7,565,399 | B1* | 7/2009 | Goel ....................... 709/203 |
| 2003/0115421 | A1 | 6/2003 | McHenry et al. |
| 2003/0135411 | A1* | 7/2003 | Ushiki et al. ............... 705/14 |
| 2006/0080439 | A1 | 4/2006 | Chud et al. |
| 2006/0080674 | A1 | 4/2006 | Bes et al. |
| 2007/0038637 | A1 | 2/2007 | Taneja et al. |
| 2007/0156966 | A1* | 7/2007 | Sundarrajan et al. ......... 711/133 |

OTHER PUBLICATIONS

Elson et al., "RFC 3507—Internet Content Adaptation Protocol (ICAP)", Apr. 2003, Internet: www.ietf.org, p. 1-46.*

Alberto Cerpa, "RE: ISTag in iCAP draft", 2001, Internet: imc.org, p. 1-2.*

Martin Stecher, "RE: Question on ISTag in ICAP protocol", 2003, Internet: imc.org, p. 1-2.*

WebWasher, "WebWasher Enterprise Edition (EE)—Setting up NetCache 5.2 with ICAP Version 1.0", 2001, WebWasher, p. 1- 34.*

ProxySG with Web Virus Scanning, "High Performance, Real-time Virus Scanning of Web Content," Blue Coat Systems, Inc., 2005.

(Continued)

*Primary Examiner*—Patrice Winder
*Assistant Examiner*—Taylor Elfervig
(74) *Attorney, Agent, or Firm*—Cesari and McKenna, LLP

(57) ABSTRACT

A novel system and method is provided for improving object cacheability in an ICAP-configured network cache. Unlike prior implementations, the present invention does not require the network cache to invalidate every data object in its object store in response to receiving an updated ISTag value from an ICAP server. Rather, the network cache invalidates data objects on an object-by-object basis after receiving the updated ISTag value. Specifically, the network cache invalidates a data object if the following conditions are satisfied: (1) the network cache has received an updated ISTag value, (2) the data object is requested by a client and (3) the requested data object requires transformation by the ICAP server. When each of these conditions is satisfied, the data object is invalidated and replaced with its transformed version. Because not every client-requested data object necessarily requires ICAP transformation after an updated ISTag value is received, the network cache may invalidate fewer data objects than in prior implementations.

36 Claims, 5 Drawing Sheets

OTHER PUBLICATIONS

Freed et al. "Multipurpose Internet Mail Extensions (MIME) Part One: Format of Internet Message Bodies", RFC 2045, Nov. 1996.

Rosenberg, J. "The Extensible Markup Language (XML) Configuration Access Protocol (XCAP)", Request for Comments 4825, May 2007, 67 pages.

"Internet Content Adaptation Protocol ICAP, Network Appliance, Version 1.01", Jul. 30, 2001. Available at http://www.icap-forum.org/documents/specification/icap_whitepaper_v1-01.pdf, retrieved Aug. 7, 2009.

* cited by examiner

OBJECT CACHEABILITY WITH ICAP

FIELD OF THE INVENTION

The present invention relates to storage systems and, more specifically, to a novel system and method for improving object cacheability using the Internet Content Adaptation Protocol (ICAP).

BACKGROUND INFORMATION

In general, a server may be configured to provide information to one or more clients according to a client/server model of information delivery. In this model, the server is a storage system that typically contains one or more mass storage devices, such as magnetic hard disks, in which information may be stored and retrieved as desired. The server is usually deployed over a computer network comprising a geographically distributed collection of interconnected communication links, such as Ethernet, optical or wireless links, that allow the clients to remotely access the server's stored information. The clients may include network devices, such as computers, that are directly or indirectly attached to the server, e.g., via point-to-point links, shared local area networks (LAN), wide area networks (WAN) or virtual private networks (VPN) implemented over a public network such as the Internet. Yet other clients may include software applications executing on computers that are configured to communicate with the server.

In some client/server arrangements, the server may be configured to operate as a network cache that buffers previously-accessed or frequently-accessed client information. As such, the network cache provides a set of clients with faster access to the buffered information than if they were to access the same information directly from a set of origin servers. For instance, the clients may be physically situated closer to the network cache than to the origin servers, or the clients may be able to access the cache over a lower latency (or higher bandwidth) data path, etc. The network cache's buffered information is typically in the form of an object store containing one or more predefined data objects which are made accessible to the clients. As used herein, a data object is any collection of data that is identifiable by a common name. For example, data objects may include conventional files, such as HyperText Mark-up Language (HTML) files ("web pages"), as well as other types of data objects known in the art.

Clients typically communicate with the network cache by exchanging discrete packets of data formatted according to predefined file-access protocols, such as the HyperText Transfer Protocol (HTTP), Network File System (NFS) protocol, Common Internet File System (CIFS) protocol, File Transfer Protocol (FTP), etc. A client may issue a file-access request that specifies, among other things, a specific data object to access and a particular operation to perform. The network cache receives the client request, processes the request, and when appropriate returns a response. For example, the client may issue a "read" request to retrieve a particular data object from the network cache and, in response, the cache may return a file-access response containing the client's requested data object.

It is often desirable for the network cache to scan client-requested data objects for viruses, spyware or other unauthorized content before the objects may be returned to their requesting clients. In the event that unauthorized content, such as a virus, is located in a client-requested data object, the client may be notified that the object is not currently accessible. Alternatively, the requested data object may be transformed, or "cleaned," in order to remove the unauthorized content before the object is returned to the client. The network cache also may be configured to perform one or more content-filtering operations on the client's file-access request, e.g., to determine whether the client is authorized to access its requested data object.

The Internet Content Adaptation Protocol (ICAP) provides a mechanism for selectively transforming file-access requests and/or responses. The ICAP protocol employs a standard client/server arrangement in which an ICAP client communicates with an ICAP server that is configured to perform a set of ICAP services. For example, the ICAP services may include, inter alia, virus scanning, spyware control and content-filtering services. For each file-access request or response that the ICAP server processes, the server returns either a modified ("transformed") or unmodified version of the request or response to the ICAP client, depending on which ICAP services were performed. The ICAP protocol may be used to perform various types of object-based, content-vectoring services and is generally described in more detail in RFC 3507 entitled *Internet Content Adaptation Protocol (ICAP)*, by J. Elson et al., published April 2003, which is hereby incorporated by reference as though fully set forth herein.

According to the standard ICAP protocol (RFC 3507), the ICAP server is configured to store an ICAP Service Tag ("ISTag") value that identifies the current software version or particular configuration of its ICAP services. The ISTag is an exemplary configuration identifier used to identify a current configuration. The configuration ID, e.g., the ISTag value, is included in every ICAP message sent from the ICAP server to the ICAP client. Thus, when the ICAP server modifies its ICAP services or otherwise changes its configuration, the server can communicate this change to the ICAP client by sending a new ISTag value in the next ICAP message forwarded to the client. In this manner, the ICAP client remains apprised of which version(s) of the ICAP services are being executed at the ICAP server.

The most common types of ICAP services performed by an ICAP server include content-filtering, virus scanning and spyware scanning. Each of these services typically relies on a corresponding database. For instance, the content-filtering services may maintain a database containing a list of authorized uniform resource identifiers (URI) or uniform resource locators (URL), the anti-virus services may maintain a database of known virus-signature patterns, and so forth. These conventional ICAP services often require frequent database updates to ensure that their databases contain up-to-date information. To communicate the database updates to the ICAP client, the ICAP server typically allocates a new ISTag value every time one of its databases is updated. For instance, the ISTag value reported by the ICAP server may be incremented, e.g., by one, after every database update.

A network cache typically executes an ICAP client that sends file-access requests and/or responses to a remote ICAP server. In conventional implementations, the network cache uses the ICAP server's ISTag value to determine which cached data objects need to be re-processed by the ICAP server. More specifically, the network cache typically maintains a hash table which is used to locate valid data objects in the network cache. In this context, a valid data object is a data object that has been processed by the most-recent version of the ICAP server's ICAP services. For instance, suppose that a data object stored in the network cache was last processed by the ICAP server when the server's ISTag value equaled one. In this case, the data object is a valid data object so long as the server's ISTag value remains equal to one. Otherwise, if the ICAP server updates its ICAP services and thus reports an updated ISTag value, e.g., equal to two, then the cached data object becomes invalid.

In practice, the network cache generates a hash key to locate a reference to a valid client-requested data object in the hash table. The hash key is generated by first combining the URL of the requested data object with the most-recent ISTag value reported by the ICAP server, and then hashing the combined URL and ISTag values, e.g., using a conventional hash function such as the Message Digest version 5 (MD5) function. The resultant hash key is used to index a matching hash-table entry corresponding to the client-requested data object. As is known in the art, the hash function is preferably selected to minimize the number of collisions in the hash table. However, in the event of a collision (i.e., two different URL and ISTag combinations generating the same hash key), the matching hash-table entry may be configured to reference multiple data objects, e.g., which may be logically organized as a linked list. When the client-requested data object cannot be located in the hash table, the data object is fetched from an appropriate origin server, sent to the ICAP server for processing and then stored on the network cache at a location that is referenced by the hash-table entry which is indexed using the hash key derived from the object's URL and the ICAP server's current ISTag value.

When the ICAP server updates its software version or configuration, and thus sends a new ISTag value to the network cache, the network cache uses the server's updated ISTag value to generate hash keys. Accordingly, if the network cache receives a client request for a data object that was previously cached using the ICAP server's old ISTag value, the requested data object will not be located in the hash table when a new hash key is derived for the object using the server's updated ISTag value. As a result, the unlocated client-requested data object has to be re-retrieved from an appropriate origin server, re-processed by the ICAP server, and stored again on the network cache at a location referenced in the hash table using the object's newly-generated hash key. The reference to the previously-cached version of the data object, which is no longer a valid data object, is eventually removed from the hash table by a selected aging mechanism. Specifically, the aging mechanism monitors the contents of the hash table and periodically removes ("purges") hash-table entries that have not been accessed for a predetermined period of time.

Because the conventional network cache generates hash keys using the ICAP server's ISTag value, the network cache necessarily invalidates all of its cached data objects in response to receiving an updated ISTag value from the ICAP server. In other words, references to data objects that were stored in the hash table using the ICAP server's old ISTag value cannot be located by hash keys generated using the server's updated ISTag value. In this manner, the previously-cached data objects are invalidated since they cannot be located in the hash table, and these invalidated object references are eventually purged from the hash table after they have aged. While this conventional solution generally works well for ensuring that only valid data objects are locatable in the network cache's hash table, this conventional approach suffers various disadvantages.

Most notably, the process of invalidating every data object in response to an updated ISTag value significantly reduces the cache-hit ratio at the network cache and, consequently, increases the response time and network-bandwidth consumption required to process client requests. For instance, most system administrators configure their ICAP servers to periodically update their ICAP-service databases, e.g., around once every 1-2 hours. This frequent database updating causes the ICAP server to repeatedly update its ISTag value, which in turn prompts the network cache to frequently invalidate all of its cached data objects. As a result, the network cache experiences a significant reduction in its cache-hit ratio, i.e., the ratio of the number of valid client-requested data objects that can be located in the network cache relative to the total number of client-requested data objects searched for at the cache. The low cache-hit ratio usually experienced in an ICAP-configured network cache requires the cache to consume a substantial amount of network bandwidth re-retrieving invalidated data objects from the origin servers. In addition, the requesting clients often experience excessive time delays waiting for their requested data objects to be re-retrieved from the origin servers and then re-processed by the ICAP server before the objects can be returned from the network cache.

It has also been observed that, in many cases, client-requested data objects include object types that are not modified by the ICAP services. Thus, it is unnecessary to invalidate and re-retrieve these types of data objects in response to frequent changes in the ICAP server's ISTag value. For example, suppose that the ICAP server is configured to perform anti-virus scanning. In this scenario, it is unnecessary for the network cache to repeatedly invalidate and re-retrieve image, media and text files that are incapable of carrying software viruses, even if the ICAP server's ISTag value is frequently changing in response to virus-signature pattern updates. Similarly, for ICAP services like virus and spyware scanning, where the only possible object modification is to remove a software virus from a data object, it is unnecessary to invalidate and re-retrieve a "cleaned" version of a data object every time the ICAP server's ISTag value changes.

The foregoing disadvantages of the conventional network-cache implementation pose an object-cacheability problem for which there is currently no known solution except for disabling ICAP processing at the network cache. Since ICAP is deployed for critical tasks, such as anti-virus and spyware control, it is undesirable for a system administrator to disable it. It is therefore generally desirable to improve object cacheability in an ICAP-configured network cache so as to increase the network cache's cache-hit ratio, thereby allowing the cache to consume less network bandwidth and reduce its average latency for responding to client requests.

SUMMARY OF THE INVENTION

The present invention overcomes the disadvantages of the prior art by providing a novel system and method for improving object cacheability in an ICAP-configured network cache. Unlike prior implementations, the present invention does not require the network cache to invalidate every data object in its object store in response to receiving an updated ISTag value from an ICAP server. Rather, the network cache invalidates data objects on an object-by-object basis after receiving the updated ISTag value. Specifically, the network cache invalidates a data object if the following conditions are satisfied: (1) the network cache has received an updated ISTag value, (2) the data object is requested by a client and (3) the requested data object requires transformation by the ICAP server. When each of these conditions is satisfied, the data object is invalidated and replaced with its transformed version. Because not every client-requested data object necessarily requires ICAP transformation after an updated ISTag value is received, the network cache may invalidate fewer data objects than in prior implementations. As a result, the network cache can improve its cache-hit ratio and reduce its average latency time for processing client requests. The network cache also may consume less network bandwidth since it does not have to re-retrieve as many data objects from the origin servers.

In accordance with an illustrative embodiment of the invention, the network cache associates a "local" ISTag value with each data object in its object store. The local ISTag value may be stored, among other places, in a header prepended to its associated data object. A data object's local ISTag value preferably equals the ISTag value of the ICAP server at the time that the data object was last processed by the ICAP server. For example, consider a data object $O_1$ that was last processed by the ICAP server when the ICAP server's ISTag value equaled 1, and a data object $O_2$ that was last processed when the ICAP server's ISTag value equaled 2. In this example, the local ISTag value associated with the data object $O_1$ may equal 1, whereas the local ISTag value associated with the data object $O_2$ may equal to 2.

In operation, the network cache may receive a client request for a particular data object stored in its object store. Further to the illustrative embodiment, the network cache is configured to return the requested data object to the client if the local ISTag value of the requested data object equals the current ISTag value of the ICAP server. However, in the event that the data object's local ISTag value does not equal the ICAP server's current ISTag value, the requested data object is forwarded to the ICAP server for processing. The ICAP server may return either an unmodified or transformed version of the client-requested data object. If the ICAP server returns an unmodified version of the data object, the network cache updates the data object's local ISTag value to equal the current ISTag value of the ICAP server, and then the network cache forwards the data object to the requesting client. On the other hand, if the ICAP server returns a transformed version of the data object, the network cache invalidates the data object in its object store and replaces the object with the object's transformed version. In this case, the transformed data object is returned to the requesting client, and the local ISTag value associated with the transformed data object is set equal to the current ISTag value of the ICAP server.

Advantageously, the novel system and method may be used in conjunction with various aging mechanisms known in the art for invalidating cached data objects in a network cache. Accordingly, the cache may invalidate data objects that satisfy the above-noted conditions of the present invention or objects that have become "aged" in accordance with an appropriate aging mechanism. Also, unlike prior implementations, the network cache can locate valid data objects in its object store without relying on the server's ISTag value. For instance, in a preferred embodiment, the network cache locates a cached data object based solely on the object's pathname, URL, file handle, memory address or other similar object-identifier value. The novel system and method may be scaled for use with one or more ICAP servers coupled to the network cache. The ICAP servers may be configured to provide various ICAP services including, but not limited to, virus scanning, spyware control and content-filtering services.

BRIEF DESCRIPTION OF THE DRAWINGS

The above and further advantages of the invention may be better understood by referring to the following description in conjunction with the accompanying drawings in which like reference numerals indicate identically or functionally similar elements, of is which.

DETAILED DESCRIPTION OF ILLUSTRATIVE EMBODIMENTS

Figure 1:
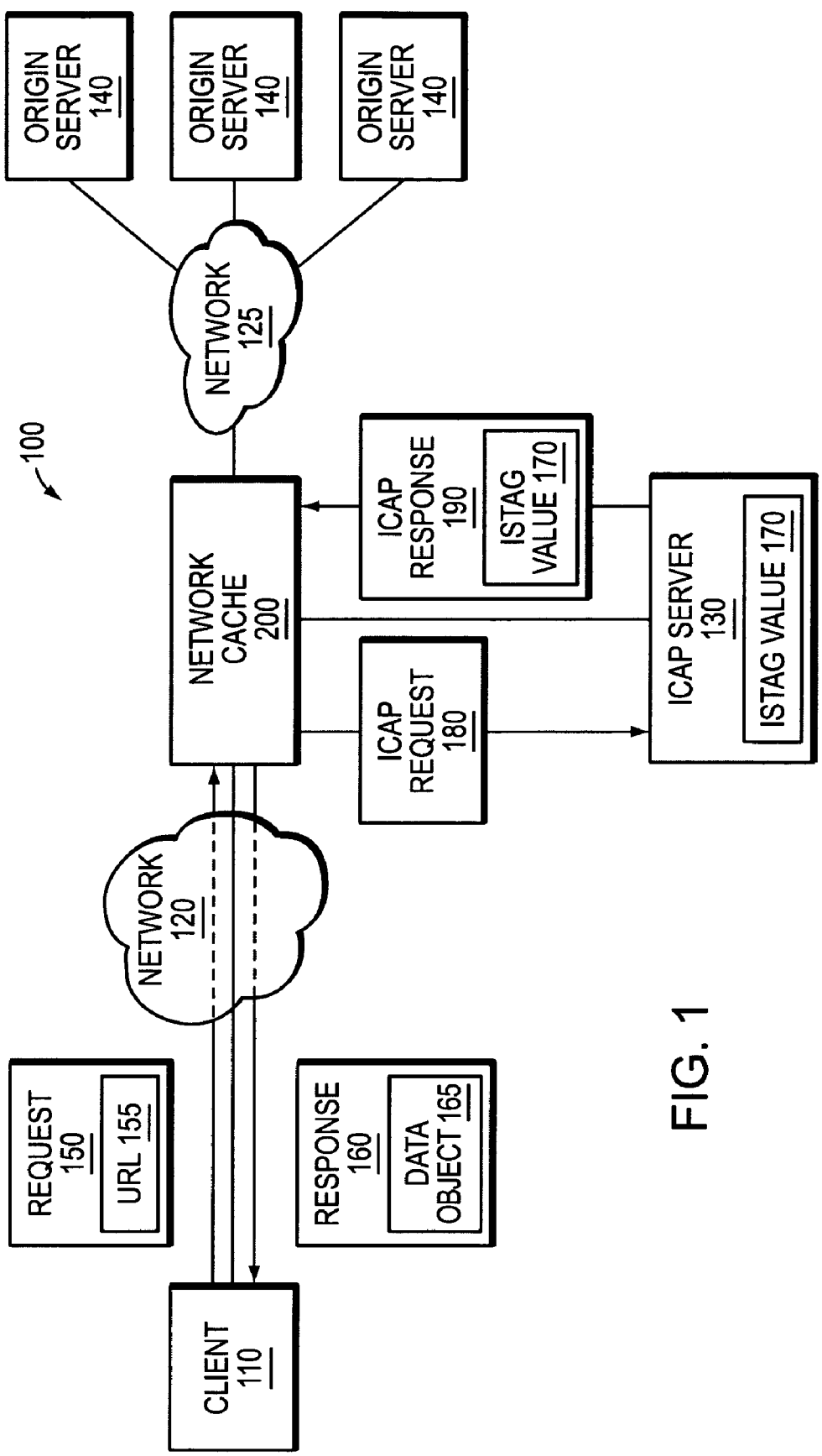
FIG. 1 is a schematic block diagram of an exemplary computer network in which the illustrative embodiment of the invention may be deployed.

FIG. 1 illustrates an exemplary computer network 100 in which an illustrative embodiment of the invention may be deployed. The network includes one or more clients 110 that request files stored on a set of origin servers 140. In practice, the origin servers may be conventional HTTP or FTP servers that provide access to various types of data objects, such as web pages, streaming audio or video files, image files, and so forth. As shown, the clients 110 do not directly communicate with the origin servers 140. Rather, a client sends a file-access request 150 to an intermediate network cache 200 that is coupled to the origin servers, e.g., through a network 125. Alternatively, at least some of the origin servers may be directly connected to the network cache. Likewise, the client 110 may be directly attached to the network cache or coupled to the cache, e.g., through the network 120.

The network cache 200 may be configured to operate in a forward or reverse proxy mode. That is, the network cache may be used to accelerate access to a selected subset of data objects stored in the origin servers 140 (reverse proxy mode) or may be configured to store copies of those data objects that were recently accessed from the origin servers by a selected set of clients (forward proxy mode). In either mode of operation, the cache 200 may receive a file-access request 150 from a client 110. The client's request may include a URL 155, or another type of object identifier, that indicates which particular data object the client desires to access. The network cache determines whether it contains a local copy of the client-requested data object. If so, the cache 200 returns its local copy of the requested data object 165 to the client in a file-access response 160. However, if the client-requested data object is not already resident in the cache, the cache may be configured to retrieve the requested data object from an appropriate origin server 140. The retrieved data object may be locally stored at the network cache 200 before the object is forwarded to the requesting client 110.

Although the file-access request 150 and response 160 are depicted as individual data packets exchanged between the client 110 and the network cache 200, those skilled in the art will appreciate that the request and response alternatively may be transmitted as a plurality of data packets. Typically, the request and response are formatted according to a predetermined file-access protocol, such as HTTP, and are transported using a reliable transport protocol, such as the conventional Transmission Control Protocol (TCP). More generally, the client/server communications in the illustrative embodiments may be implemented using various network protocols and physical media without limitation.

The network cache 200 is coupled to an ICAP server 130 which performs a set of ICAP services. As set forth in the above-incorporated RFC 3507, the ICAP services typically include object-based content vectoring for HTTP messages. In practice, the network cache 200 may forward an ICAP request 180 to the ICAP server 130. The ICAP request 180 may include the URL 155 or the client-requested data object 165 for the ICAP server to process. In response to receiving the client-requested data object, the ICAP server 130 may perform, e.g., spyware and/or virus scans to ensure that the client-requested data object does not contain a software virus. If the ICAP server detects a virus, the ICAP server may return an ICAP response 190 that includes a transformed, or "cleaned", version of the data object 165, i.e., where the detected virus has been removed. Alternatively, if no virus is detected, the ICAP response 190 may include an unmodified version of the data object 165. The transformed or unmodified version data object may be stored locally at the network cache 200 and then returned to the requesting client 110.

The ICAP server 130 maintains an ISTag value 170 that identifies the current software version or particular configuration of the ICAP services executed at the ICAP server. In accordance with the published ICAP protocol, each ICAP response 190 includes a copy of the ICAP server's ISTag value 170. The ICAP server 130 allocates a new ISTag value 170 every time its software version or configuration changes, such as when one of its databases is updated. For example, the ISTag value reported by the ICAP server may be incremented, e.g., by one, every time the contents of the server's anti-virus or spyware database is updated.

Unlike prior implementations, the network cache 200 does not invalidate every data object in its object store in response to receiving an updated ISTag value 170 from the ICAP server 130. Rather, the network cache invalidates data objects on an object-by-object basis after receiving the updated ISTag value. Specifically, the network cache 200 invalidates a data object if the following conditions are satisfied: (1) the network cache has received an updated ISTag value, (2) the data object is requested by a client and (3) the requested data object requires transformation by the ICAP server. When each of these conditions is satisfied, the data object is invalidated and replaced with its trans-formed version. Because not every client-requested data object necessarily requires ICAP transformation after an updated ISTag value is received, the network cache may invalidate fewer data objects than in prior implementations. As a result, the network cache can improve its cache-hit ratio and reduce its average latency time for processing client requests. The network cache also may consume less network bandwidth since it does not have to re-retrieve as many data objects from the origin servers.

Figure 2:
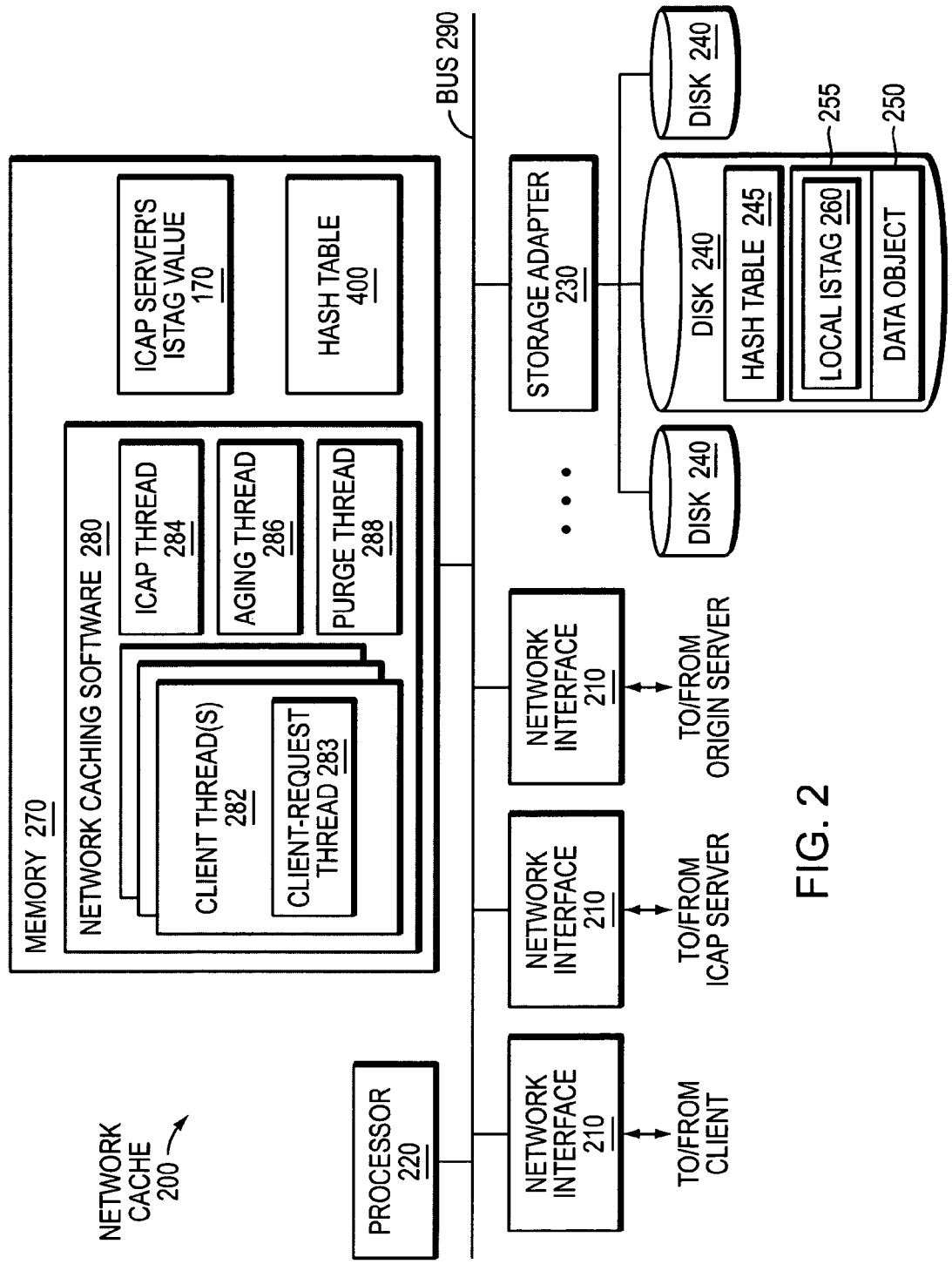
FIG. 2 is a schematic block diagram of an exemplary network cache that advantageously may be used in accordance with the illustrative embodiment.

FIG. 2 is a schematic block diagram of the exemplary network cache 200 that advantageously may be used with the present invention. Although the network cache is illustrated on a generic hardware platform, the cache generally may be implemented in any type of special-purpose computer (e.g., server) or general-purpose computer. The network cache 200 comprises, among other things, one or more network interfaces 210, a processor 220, a storage adapter 230 and a memory 270 interconnected by a system bus 290.

Each network interface 210 includes the mechanical, electrical and signaling circuitry for sending and receiving data packets to/from other computers connected to the network cache 200, e.g., over Ethernet links, optical links, wireless links, etc. Each network interface 210 may contain specialized processing elements, such as logic or processors, that format in-coming and out-going data packets consistent with a predetermined network communication protocol. For example, a first network interface 210 may be configured to exchange HTTP messages with a remote client 110, e.g., coupled to the first interface over the network 120. A second network interface may be configured to communicate ICAP messages with the ICAP server 130. A third network interface may be configured to exchange HTTP or FTP messages with an origin server 140, e.g., coupled to the third interface via the network 125.

The storage adapter 230 interfaces with one or more mass storage devices 240, such as magnetic disks, to store and retrieve a set of data objects 250 from an object store that is made accessible to the clients 110. The storage adapter includes input/output (I/O) interface logic and circuitry that couples the disks to the adapter over an I/O interconnect arrangement, such as a conventional Fibre-channel serial link topology. A data object 250 may be retrieved by the storage adapter 230 and, if necessary, processed by the processor 220 (or the adapter itself) prior to being forwarded over the system bus 290 to an appropriate network interface 210. At the network interface, the data object may be formatted into a file-access response 160 that is returned to a requesting client 110.

In accordance with an illustrative embodiment of the invention, each data object 250 is associated with a "local" ISTag value 260. The local ISTag value may be stored, among other places, in an object header 255 prepended to its associated data object 250. Of course, in addition to the local ISTag value 260, the object header 255 also may be configured to store other information related to the data object 250. The data object's local ISTag value preferably equals the ISTag value 170 of the ICAP server 130 at the time that the data object was last processed by the ICAP server. For example, consider a data object $O_1$ that was last processed by the ICAP server when the ICAP server's ISTag value equaled 1, and a data object $O_2$ that was last processed when the ICAP server's ISTag value equaled 2. In this example, the local ISTag value associated with the data object $O_1$ may equal 1, whereas the local ISTag value associated with the data object $O_2$ may equal to 2.

Each mass storage device 240 may be embodied as any type of writable storage device, such as a magnetic or optical disk drive, a non-volatile random access memory (e.g., FLASH memory), a magnetic or optical tape drive, an erasable programmable read-only memory (EPROM) or any other form of mass storage device. Preferably, the set of files is stored in an array of storage disks 240. The disks may be arranged as a Redundant Array of Independent Disks (RAID) group so that some disks store striped data and at least one disk stores separate parity data for the group, e.g., in accordance with a conventional RAID-4 configuration. However, other configurations (e.g. RAID-5 having distributed parity across stripes) are also contemplated. Besides storing data objects, at least one of the mass storage devices 240 also stores a searchable data structure, such as a hash table 245, that enables the network cache 200 to locate individual data objects 250 in the mass storage devices 240.

The memory 270 comprises storage locations that are addressable by the processor and adapters for storing program code and data. The memory preferably comprises a form of random access memory (RAM) that is generally cleared by a power cycle or other reboot operation (e.g., it is a "volatile" memory). The processor and adapters comprise processing elements, logic and/or circuitry configured to execute the software code and manipulate the data stored in the memory 270. It will be apparent to those skilled in the art that various types of memory means, including computer-readable media and electromagnetic signals, may be used for storing and transporting program instructions pertaining to the inventive system and method described herein.

Figure 4:
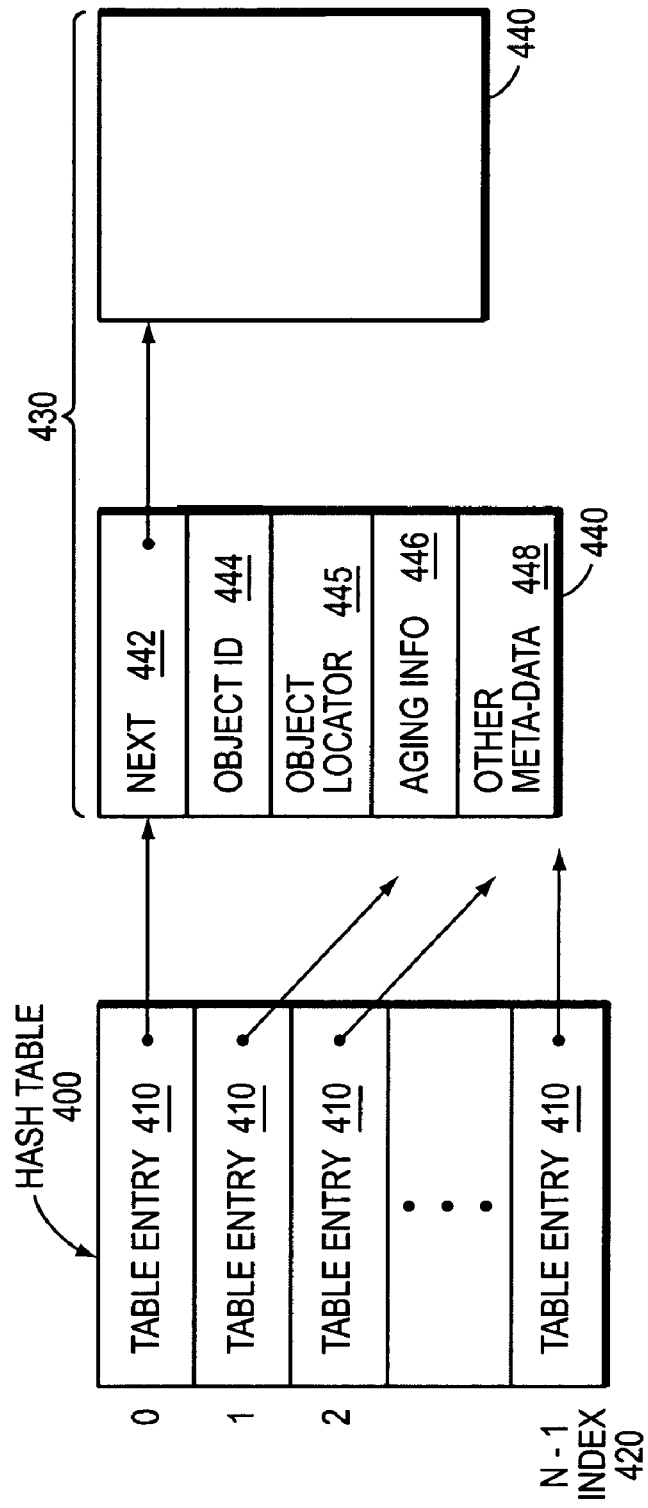
FIG. 4 is a schematic block diagram of an exemplary hash table that may be used to locate data objects in the exemplary network cache in accordance with the illustrative embodiment.

The memory 270 is preferably configured to store, inter alia, network caching software 280, the ICAP server's most-recently advertised ISTag value 170 and a hash table 400. The ISTag value 170 is preferably stored at a predetermined location in the memory 270 and the value of the ISTag value may be determined based on the contents of the most-recently received ICAP response 190. The hash table 400 illustratively contains a subset of the information stored in the on-disk hash table 245. Specifically, the hash table 400 contains information that enables the network cache 200 to locate those data objects 250 that have been recently accessed from the storage disks 240. The organization of the illustrative hash table 400 is described in more detail below (FIG. 4). However, it is also expressly contemplated that the hash tables 245 and 400 may be organized as any type of searchable data structures consistent with the teachings of the present invention. Thus, the tables 245 and 400 are formatted as hash tables only for purposes of illustration and description of the illustrative embodiment.

Network caching software 280, portions of which are typically resident in the memory 270 and executed by the processor 220, functionally invokes proxy-caching operations for storing and retrieving client-requested data objects from the storage disks 240. To that end, the network caching software cooperates with at least one origin server 140 to acquire the set of data objects stored in the array of disks. The caching software 280 may be used to configure the network cache 200 as either a forward or reverse proxy server. In practice, the network caching software 280 may be embodied within a version of the NetCache™ software developed by Network Appliance, Inc. of Sunnyvale, California or any other similar software that is used to manage proxy-caching operations.

In a preferred embodiment, the network caching software 280 includes, among other things, one or more executable client threads 282, such that a separate client thread is allocated for each client 110 that requests data objects from the network cache 200. Each client thread 282 may instantiate a respective client-request thread 283 for processing individual file-access requests 150 received from the client thread's associated client. In order to process a received file-access request, the client-request thread 283 may cooperate with other executable threads, such as an ICAP thread 284, an aging thread 286 and a purge thread 288, in the network caching software 280.

The ICAP thread 284 performs functions that enables the network cache 200 to communicate with the ICAP server 130. For instance, the ICAP thread is preferably configured to transmit ICAP requests 180 and receive ICAP responses 190 from the ICAP server. The aging thread 286 performs aging processes for maintaining the hash table 400. Specifically, when the aging thread identifies a hash-table entry whose associated data object has not been accessed for a predetermined amount of time or otherwise has become "aged," the aging thread may invoke the purge thread 288 to remove the data object from the hash table 400, i.e., by removing the hash table's reference to the aged data object. The purge thread 288 also may be called on by the client-request thread 283 to is remove invalidated data objects from the hash table 400.

In operation, a client 110 may send a file-access request 150 to a network interface 210 in the network cache 200. The network interface that receives the file-access request may forward the request to the client's associated client thread 282, which in turn may instantiate a new client-request thread 283 for processing the received file-access request. The client-request thread locates an object identifier, such as a URL, URI, file handle, memory address, inode number, file or volume block number or the like, in the received file-access request. In the illustrative embodiment, the client-request thread 283 locates a URL 155 in the received file-access request 150. Then, the client-request thread uses the client's specified URL to generate a hash key for locating the client's requested data object via the hash table 400.

Figure 3:
FIG. 3 is a schematic block diagram of an exemplary hash function that may be used to generate a hash key in accordance with the illustrative embodiment.

As shown in FIG. 3, the client-request thread 283 preferably derives a hash key 310 by hashing the received URL 155 using a predetermined hash function (H) 300.

Unlike prior implementations, the hash key 310 is not dependent on the ICAP server's ISTag value 170. For instance, in the illustrative embodiment, the hash key 310 is preferably derived solely based on the client's specified URL 155. The hash function 300 may be any mathematical function, or set of functions, that converts the received URL 155 into a suitable hash key 310 that can be used to index a table entry in the hash table 400. For example, the hash function may be implemented as a conventional MD5 hash function or any other hash function known in the art.

FIG. 4 is a schematic block diagram of the exemplary hash table 400. Preferably, the hash table 400 is initially loaded into the memory 270 at system startup time by copying contents of the on-disk hash table 245 into the memory. When the network cache 200 is later shutdown, the hash table 400 may be committed to disk storage 240, thereby updating the contents of the on-disk hash table 245.

The hash table 400 contains N hash-table entries 410, each of which is associated with a unique index value 420. Preferably, a hash key 310 may be determined to "match" a hash-table entry 410 when the hash key equals the index value 420 associated with the hash-table entry. Each hash-table entry 410 is configured to store a pointer value that references the memory location of a corresponding list 430 of zero or more list entries 440. In some embodiments, at least one of the list entries 440, such as the first list entry, may be directly incorporated into the hash-table entry 410. Each list entry 440 is configured to store, among other things, a next pointer 442, an object identifier 444 ("object ID"), an object locator 445, aging information 446 and other meta-data 448.

The next pointer 442 stores a value indicating the memory location of the next entry 440 in the list 430. The next pointer may store a "null" value or other predetermined value to indicate when there are no subsequent entries 440 in the list 430. The object ID value 444 stores a URL or other object identifier associated with a particular data object 250 stored in the network cache 200. Thus, the derived hash key 310 matches a list entry 440 when (i) the derived hash key equals the index value 420 of the hash-table entry 410 referencing the list 430 containing the list entry 440 and (ii) the URL 155 used to derive the hash key equals the value of the list entry's object ID 444. The object locator 445 stores a value, such as an inode value, file block number or memory reference, that can be used to uniquely identify the storage location of the data object identified by the object ID 444. Preferably, each list entry 440 is associated with a single data object stored in the network cache and, thus, contains only a single object locator value 445.

The aging information 446 stores information that enables the aging thread 286 to determine whether the data object associated with the list entry 440 has become aged, and therefore whether the list entry should be removed from the hash table 400, e.g., by the purge thread 288. Such aging information may include, for example, a timestamp indicating when the list-entry's associated data object was last accessed and/or a hit-counter value indicating the number of times that the data object was accessed, and so forth. Preferably, the aging thread 286 periodically scans the list entries 440 in the hash table 400, so as to remove those entries whose aging information 446 indicates that their data objects have aged. Those skilled in the art will appreciate that various aging algorithms may be utilized by the aging thread without limitation. The other meta-data 448 may store other information associated with the list entry 440 and/or its associated data object.

According to the illustrative embodiment, the client-request thread 283 attempts to locate a list entry 440 matching the derived hash key 310. The client-request thread first searches the hash table 400, and if it cannot locate a matching list entry 440, the thread next searches the on-disk hash table 245. In the event that a matching list entry cannot be found in either of the hash tables 400 or 235, the client-request thread retrieves the client-requested data object from an appropriate origin server 140. In this situation, the client-request thread 283 receives the client-requested data object from the origin server and then calls on the ICAP thread 284 to forward the data object to the ICAP server 130 for processing. After sending the data object to the ICAP server, the ICAP thread later receives an ICAP response 190 containing either a transformed or unmodified version of the client's requested data object as well as the ICAP server's current ISTag value 170. The ICAP thread 284 forwards the data object and ISTag value to the client-request thread 283, which in turn updates the ISTag value 170 stored in the memory 270 and writes a copy of the data object to disk storage 240. The client-request thread also adds a new list entry 440 to the hash tables 400 and 245 for the data object. The client-request thread 283 returns a file-access response 160 containing the client-requested data object over an appropriate network interface 210 to the requesting client 110.

In contrast, if the client-request thread 283 is able to locate a list entry 440 matching the derived hash key 310, the client-request thread returns the list entry's associated data object to the requesting client 110 if the object's local ISTag value 260 equals the current ISTag value 170 of the ICAP server, i.e., stored at the predetermined location in the memory 270 (or disk 240). However, in the event that the data object's local ISTag value 260 does not equal the ICAP server's current ISTag value 170, i.e., the ICAP server has updated its ISTag value relative to the last time that the data object was processed by the ICAP server, then the client-request thread 283 calls on the ICAP thread 284 to forward the data object to the ICAP server 130 so that the data object can be re-processed using the server's updated software version or configuration. After processing the client-requested data object, the ICAP server may return an ICAP response 190 containing either an unmodified or transformed version of the data object as well as the ICAP server's current (updated) ISTag value 170.

If the ICAP server returns an unmodified version of the previously-cached data object, the client-request thread 283 updates the data object's local ISTag value 260 to equal the ICAP server's current ISTag value 170. In contrast with prior implementations where data objects are invalidated in response to a change in the ICAP server's ISTag value, the unmodified data object in the illustrative embodiment is not invalidated since the object was not transformed by the ICAP server, even though the ICAP server's ISTag value was updated. Instead, the local ISTag value 260 associated with the previously-cached version of the data object is updated to equal the current ISTag value 170 reported by the ICAP server. The client-request thread 283 forwards a file-access response 160 containing the unmodified data object to the requesting client 110.

On the other hand, if the ICAP server 130 returns a transformed version of the previously-cached data object, the client-request thread 283 stores a copy of the trans-formed version of the data object in the disk storage 240 and sets the local ISTag value 260 of the transformed data object equal to the current ISTag value 170 reported by the ICAP server. In this case, the client-request thread 283 invalidates the previously-stored version of the data object by calling on the purge thread 288 to remove the previously-stored object's list entry 440 from the hash table 400. Next, the client-request thread 283 adds a new list entry 440 to the hash table 400 for the transformed version of the data object. The client-request thread 283 forwards a file-access response 160 containing the transformed version of the data object to the requesting client 110.

Figure 5A:
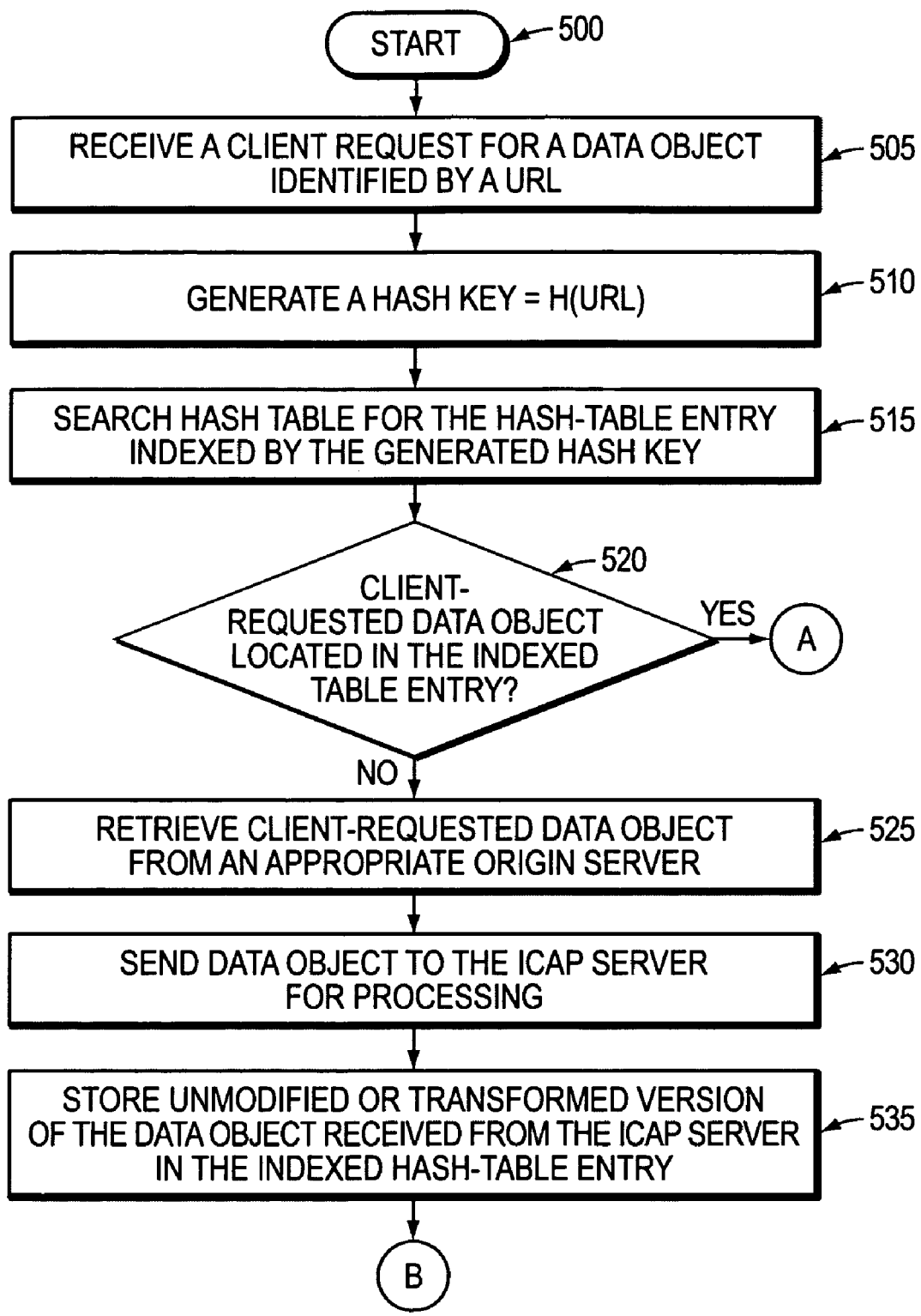
FIGS. 5A-B are a flowchart illustrating a sequence of steps that may be performed at the exemplary network cache in accordance with the illustrative embodiment of the invention.
Figure 5B:
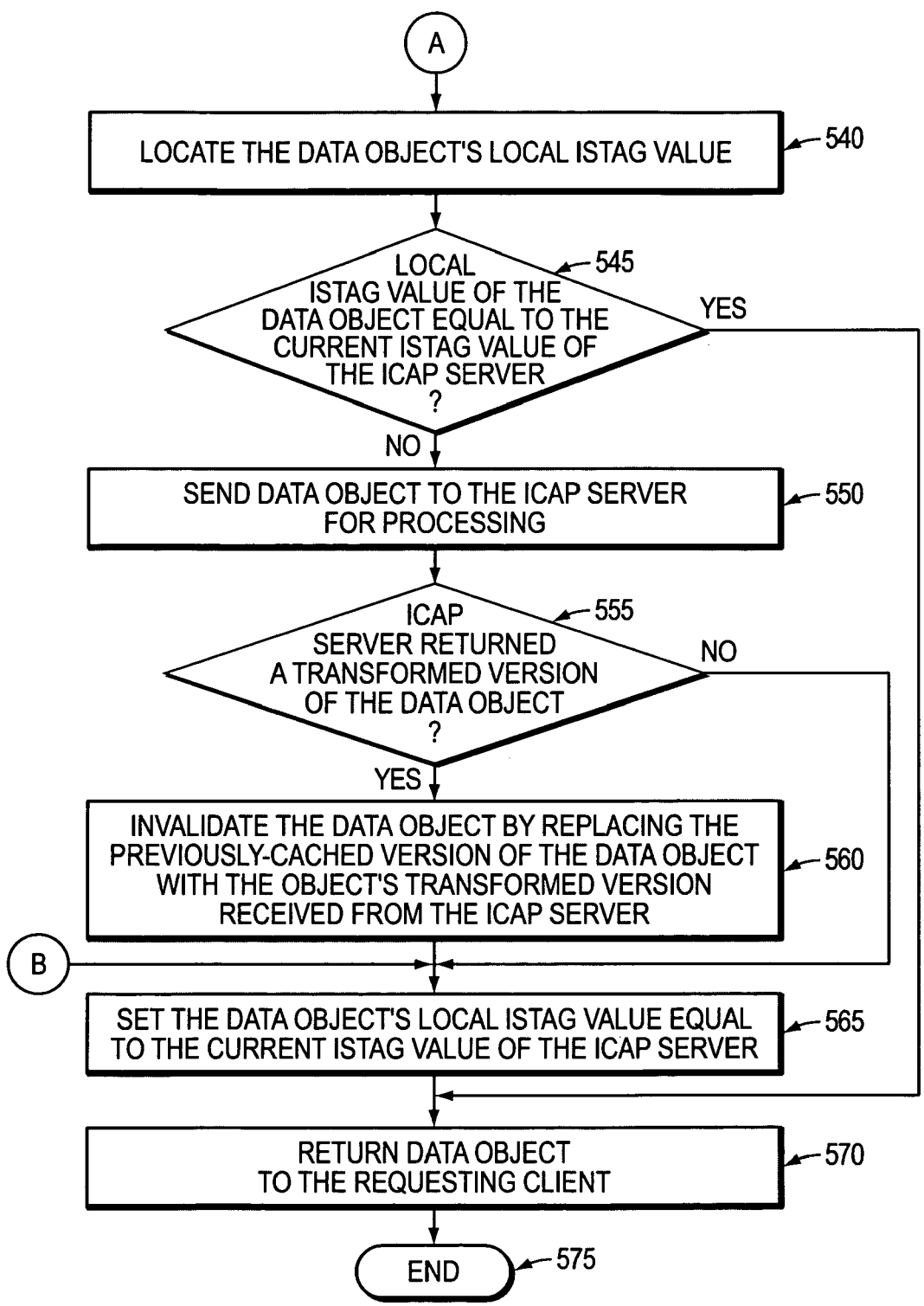

FIGS. 5A-B illustrate a sequence of steps that may be performed at the network cache 200 in accordance with the illustrative embodiment of the invention. The sequence starts at step 500 and proceeds to step 505 where a client's file-access request 150 is received at a network interface 210 of the network cache 200. The received request preferably includes an object identifier, such as a URL 155, that indicates a particular data object to retrieve at the network cache. At step 510, network cache generates a hash key 310 by applying a predetermined hash function to the received URL 155. Next, at step 515, the derived hash key 310 is used to search the hash table 400 for a matching hash-table entry 410 whose associated index value 420 equals the generated hash key.

At step 520, it is determined whether the client-requested data object can be located in the indexed hash-table entry 410. That is, the indexed hash-table entry 410 may be examined to determine whether its associated list 430 includes a list entry 440 associated with the client-requested data object. For instance, the list entry may contain an object ID value 444 indicating that the list entry is associated with the same URL 155 specified in the client's request. If a list entry 440 cannot be found associated with the client-requested data object, then at step 525 the client-requested data object is retrieved from an appropriate origin server 140. The retrieved data object is sent to the ICAP server 130 for processing, at step 530. At step 535, the ICAP server returns an ICAP response 190 containing either an unmodified or transformed version of the data object, which is added to the hash table 400 by inserting a new list entry 440 in the list 430 referenced by the indexed hash-table entry 410. Notably, the ICAP response also specifies the ICAP server's current ISTag value 170, which may be written to a predetermined location in the network cache's memory 270. The sequence then advances to step 565.

If, at step 520, a list entry 440 corresponding to the client-requested data object can be found in the indexed hash-table entry 410, then the sequence advances to step 540 where the data object's local ISTag value 260 is located, e.g., in an object header 255 prepended to the client-requested data object. At step 545, the network cache determines whether the local ISTag value 260 of the client-requested data object equals the current ISTag value 170 of the ICAP server, e.g., stored at the predetermined location in the memory 270. If so, the sequence advances to step 570.

However, at step 545, if the local ISTag value 260 of the client-requested data object does not equal the current ISTag value 170 of the ICAP server 130, i.e., the ICAP server's ISTag value has changed since the last time the data object was processed by the ICAP server, then at step 550 the previously-cached version of the client-requested data object is sent to the ICAP server to be processed again. In response, the ICAP server returns an ICAP response 190 containing either an unmodified or transformed version of the data object, as well as the ICAP server's updated ISTag value 170.

At step 555, the network cache determines whether the ICAP server returned a transformed version of the data object. For instance, the type of ICAP response 190 may indicate whether the response contains an unmodified or transformed version of the data object, as set forth in the ICAP protocol (RFC 3507). If the ICAP server returned an unmodified version of the data object, the sequence proceeds to step 565. On the other hand, if the ICAP server returned a transformed version of the data object, then at step 560, the previously-cached version of the data object is invalidated in the hash table 400. More specifically, the list entry 440 corresponding to the previously-cached version of the data object may be removed from the hash table 400, and a new list entry 440 may be added to the hash-table entry 410 indexed by the generated hash key 310. In this case, the new list entry 440 added to the hash table corresponds to the transformed version of the data object returned from the ICAP server. At step 565, the data object's local ISTag value 260 is set equal to the current ISTag value 170 of the ICAP server. The network cache 200 returns the client-requested data object to the requesting client 110, at step 570. The sequence ends at step 575.

The foregoing description has been directed to particular embodiments of this invention. It will be apparent, however, that other variations and modifications may be made to the described embodiments, with the attainment of some or all of their advantages. For instance, the novel system and method may be scaled for use with one or more ICAP servers coupled to the network cache 200. For instance, each ICAP server 130 may be associated with a different hash table 400 in the network cache 200, or alternatively the hash table 400 may be configured to locate client-requested data objects for multiple ICAP servers. Further, the data objects 250 may be associated with a plurality of local ISTag values 260, one local ISTag value for each ICAP server 130 that has processed the data object. The memory 270 may be configured to store multiple ISTag values 170 associated with the plurality of ICAP servers.

Also, those skilled in the art will understand that the ICAP server 130 may be configured to provide various ICAP services including, but not limited to, virus scanning, spyware control and content-filtering services. Besides scanning client-requested data objects, the ICAP server also may be configured to scan the contents of a client's file-access request in order to determine whether the client is permitted to access a particular client-requested data object. For instance, the ICAP server may scan the contents of the client's specified URL 155 to determine whether the client has access privileges to its requested data object. If not, the ICAP server may return an ICAP response 190 denying the client access to the requested data object.

It is also expressly contemplated that the various implementations described with regards to the illustrative embodiment may be replaced with functionally equivalent implementations without departing from the spirit and scope of the invention. For instance, one or more of the executable threads 282-288 may be implemented as separate processes or as multiple threads executing over the same process. By way of further example, while a list entry 440 associated with an invalidated data object may be removed from the hash table 400 and replaced with a new list entry 440 corresponding to the data object's transformed version, those skilled in the art will appreciate that the list entry 440 of the previously-cached version of the data object instead may be modified, rather than removed, to reference the object's transformed version. More generally, the procedures, threads, processes and/or modules described herein may be implemented in hardware, software, embodied as a computer-readable medium having program instructions, firmware, or a combination thereof.

Therefore, it is the object of the appended claims to cover all such variations and modifications as come within the true spirit and scope of the invention.

What is claimed is:

1. A method for improving object cacheability at an Internet Content Adaptation Protocol (ICAP) configured network cache coupled to both a client and an ICAP server, comprising:
   operatively interconnecting the network cache with an origin server via a network;
   receiving a request for a client-requested data object stored in an object store of the network cache;
   determining whether a configuration identifier at the ICAP server has changed since a last time that the client-requested data object was processed by the ICAP server, wherein the configuration identifier specifies a particular configuration of one or more ICAP services; and
   forwarding from the object store of the network cache, in response to determining that the configuration identifier at the ICAP server has changed, the client-requested data object to the ICAP server to be re-processed by the ICAP server.

2. The method of claim 1 wherein the configuration identifier comprises an ICAP Service Tag (ISTag) value.

3. The method of claim 1, further comprising:
   receiving, in response to forwarding the client-requested data object to the ICAP server to be re-processed by the ICAP server, a response from the ICAP server;
   determining whether the response received from the ICAP server includes a transformed version of the client-requested data object;
   performing, in response to determining that the response received from the ICAP server includes the transformed version of the client-requested data object, the steps of:
   (i) invalidating the client-requested data object at the network cache;
   (ii) replacing the client-requested data object with the transformed version of the client-requested data object received from the ICAP server; and
   (iii) forwarding a response containing the transformed version of the client-requested data object to the client.

4. The method of claim 3, further comprising:
   receiving a configuration identifier in the response received from the ICAP server; and
   storing the received configuration identifier at the network cache.

5. The method of claim 1, wherein determining whether the configuration identifier at the ICAP server has changed further comprises:
   associating a local configuration identifier with the client-requested data object, the local configuration identifier indicating the configuration identifier of the ICAP server at the time that the client-requested data object was last processed by the ICAP server; and
   comparing the configuration identifier at the ICAP server with the local configuration identifier associated with the client-requested data object to determine whether the configuration identifier at the ICAP server has changed since the last time that the client-requested data object was processed by the ICAP server.

6. The method of claim 5, further comprising:
   receiving a response from the ICAP server, the response containing the ICAP server's current configuration identifier;

determining whether the response received from the ICAP server includes a transformed version of the client-requested data object;

performing, in response to determining that the response received from the ICAP server does not include the transformed version of the client-requested data object, the steps of:
  (i) setting the local configuration identifier associated with the client-requested data object equal to the ICAP server's current configuration identifier; and
  (ii) forwarding a response containing the client-requested data object to the client.

7. The method of claim 1, further comprising:
forwarding, in response to determining that the configuration identifier at the ICAP server has not changed, a response containing the client-requested data object to the client.

8. The method of claim 1, further comprising:
determining whether the client-requested data object is stored in the network cache; and
retrieving, in response to determining that the client-requested data object is not stored at the network cache, the client-requested data object from the origin server.

9. The method of claim 8, wherein determining whether the client-requested data object is stored in the network cache further comprises:
locating an object identifier stored in the request for the client-requested data object;
generating an index value into a searchable data structure, the index value being generated based on the located object identifier; and
using the generated index value to locate a matching entry in the searchable data structure, the matching entry indicating whether the client-requested data object is stored in the network cache.

10. The method of claim 9, wherein the object identifier is a uniform resource locator (URL).

11. The method of claim 9, wherein the generated index value is a hash key and the searchable data structure is a hash table.

12. The method of claim 1, wherein the origin server is a storage system.

13. An Internet Content Adaptation Protocol (ICAP) configured network cache coupled to both a client and an ICAP server, comprising:
means for operatively interconnecting the network cache with an origin server via a network;
means for receiving a request for a client-requested data object stored in an object store of the network cache;
means for determining whether a configuration identifier at the ICAP server has changed since a last time that the client-requested data object was processed by the ICAP server, wherein the configuration identifier specifies a particular configuration of one or more ICAP services; and
means for forwarding from the object store of the network cache, in response to determining that the configuration identifier at the ICAP server has changed, the client-requested data object to the ICAP server to be re-processed by the ICAP server.

14. The network cache of claim 13 wherein the configuration identifier comprises an ICAP Service Tag (ISTag) value.

15. The network cache of claim 13, further comprising:
means for receiving, in response to forwarding the client-requested data object to the ICAP server to be re-processed by the ICAP server, a response from the ICAP server;
means for determining whether the response received from the ICAP server includes a transformed version of the client-requested data object;
means for performing, in response to determining that the response received from the ICAP server includes the transformed version of the client-requested data object, the steps of:
  (i) invalidating the client-requested data object at the network cache;
  (ii) replacing the client-requested data object with the transformed version of the client-requested data object received from the ICAP server; and
  (iii) forwarding a response containing the transformed version of the client-requested data object to the client.

16. The network cache of claim 15, further comprising:
means for receiving a configuration identifier in the response received from the ICAP server; and
means for storing the received configuration identifier at the network cache.

17. The network cache of claim 13 further comprising:
means for associating a local configuration identifier with the client-requested data object, the local configuration identifier indicating the configuration identifier of the ICAP server at the time that the client-requested data object was last processed by the ICAP server; and
means for comparing the configuration identifier at the ICAP server with the local configuration identifier associated with the client-requested data object to determine whether the configuration identifier at the ICAP server has changed since the last time that the client-requested data object was processed by the ICAP server.

18. The network cache of claim 17 further comprising:
means for receiving a response from the ICAP server, the response containing the ICAP server's current configuration identifier;
means for determining whether the response received from the ICAP server includes a transformed version of the client-requested data object;
means for performing, in response to determining that the response received from the ICAP server does not include the transformed version of the client-requested data object, the steps of:
  (i) setting the local configuration identifier associated with the client-requested data object equal to the ICAP server's current configuration identifier; and
  (ii) forwarding a response containing the client-requested data object to the client.

19. The network cache of claim 13 further comprising:
means for forwarding, in response to determining that the configuration identifier at the ICAP server has not changed, a response containing the client-requested data object to the client.

20. The network cache of claim 13 further comprising:
means for determining whether the client-requested data object is stored in the network cache; and
means for retrieving, in response to determining that the client-requested data object is not stored at the network cache, the client-requested data object from the origin server.

21. The network cache of claim 20, further comprising:
a second network interface configured to receive a response from the ICAP server, wherein the memory is further configured to store instructions for performing the steps of:

determining whether the response received from the ICAP server includes a transformed version of the client-requested data object;

performing, in response to determining that the response received from the ICAP server includes the transformed version of the client-requested data object, the steps of:
(i) invalidating the client-requested data object at the network cache;
(ii) replacing the client-requested data object with the transformed version of the client-requested data object received from the ICAP server; and
(iii) forwarding a response containing the transformed version of the client-requested data object to the client.

22. The network cache of claim 13 further comprising:
means for locating an object identifier stored in the request for the client-requested data object;
means for generating an index value into a searchable data structure, the index value being generated based on the located object identifier; and
means for using the generated index value to locate a matching entry in the searchable data structure, the matching entry indicating whether the client-requested data object is stored in the network cache.

23. An Internet Content Adaptation Protocol (ICAP) configured network cache coupled to both a client and an ICAP server, comprising:
a network configured to operatively interconnect the network cache with an origin server;
a processor;
a network interface configured to receive a request for a client-requested data object stored in an object store of the network cache;
a memory configured to store instructions for execution by the processor, at least some of the instructions being configured to instruct the processor to,
determine whether a configuration identifier value at the ICAP server has changed since a last time that the client-requested data object was processed by the ICAP server, wherein the configuration identifier specifies a particular configuration of one or more ICAP services; and
forward from the object store of the network cache, in response to determining that the configuration identifier at the ICAP server has changed, the client-requested data object to the ICAP server to be re-processed by the ICAP server.

24. The network cache of claim 23 wherein the configuration identifier comprises of an ICAP Service Tag (ISTag) value.

25. The network cache of claim 23, wherein the response received from the ICAP server includes the configuration identifier of the ICAP server, and wherein the memory is further configured to store instructions for storing the received configuration identifier at a predetermined location in the memory.

26. The network cache of claim 23, further comprising:
one or more storage devices configured to store data objects, at least some of the data objects stored on the storage devices being associated with a local configuration identifier, the local configuration identifier value indicating the configuration identifier of the ICAP server at the time that the data object was last processed by the ICAP server.

27. The network cache of claim 26, wherein the memory is further configured to store instructions for comparing the configuration identifier at the ICAP server with the local configuration identifier associated with the client-requested data object to determine whether the configuration identifier at the ICAP server has changed since the last time that the client-requested data object was processed by the ICAP server.

28. The network cache of claim 27, further comprising:
a second network interface configured to receive a response from the ICAP server, the response containing the ICAP server's current configuration identifier,
wherein the memory is further configured to store instructions for performing the steps of:
determining whether the response received from the ICAP server includes a transformed version of the client-requested data object;
performing, in response to determining that the response received from the ICAP server does not include the transformed version of the client-requested data object, the steps of:
(i) setting the local configuration identifier associated with the client-requested data object equal to the ICAP server's current configuration identifier; and
(ii) forwarding a response containing the client-requested data object over the network interface to the client.

29. The network cache of claim 23, wherein the memory is further configured to store a searchable data structure containing references to data objects stored on the network cache, the memory being further configured to store program instructions for,
locating an object identifier stored in the request for the client-requested data object;
generating an index value into the searchable data structure, the index value being generated based on the located object identifier; and
using the generated index value to locate a matching entry in the searchable data structure, the matching entry indicating whether the client-requested data object is stored in the network cache.

30. The network cache of claim 29, wherein the object identifier is a uniform resource locator (URL).

31. The network cache of claim 29, wherein the generated index value is a hash key and the searchable data structure is a hash table.

32. A computer-readable medium containing executable program instructions executed by a processor, comprising:
program instructions that operatively interconnect the network cache with an origin server via a network;
program instructions that receive a request for a client-requested data object stored in an object store of the network cache;
program instructions that determine whether an ICAP Service Tag (ISTag) value at an ICAP server has changed since a last time that the client-requested data object was processed by the ICAP server, wherein the configuration identifier specifies a particular configuration of one or more ICAP services; and
program instructions that forward from the object store of the network cache, in response to determining that the ISTag value at the ICAP server has changed, the client-requested data object to the ICAP server to be re-processed by the ICAP server.

33. A method for improving object cacheability using Internet Content Adaptation Protocol (ICAP), comprising:
operatively interconnecting an ICAP configured network cache with an origin server via a network;
associating an ICAP server with an ICAP tag value, the ICAP tag value indicating a particular configuration of one or more ICAP services;
associating a local tag value with a data object of a plurality of data objects in an object store of the network cache, wherein the local tag value is equal to the ICAP tag value of the ICAP server at a time the data object was last processed by the ICAP server;

receiving a client request for the data object stored in the object store of the network cache;

determining if the local tag value of the data object equals a current ICAP tag value of the ICAP server;

returning, in response to the local tag value of the data object being equal to the current ICAP tag value of the ICAP server, the data object to the client; and forwarding from the object store of the network cache, in response to the local tag value of the requested data object not being equal to the current ICAP tag value of the ICAP server, the data object to the ICAP server to be re-processed.

34. A method for improving object cacheability using Internet Content Adaptation Protocol (ICAP), comprising:

operatively interconnecting an ICAP configured network cache with an origin server via a network;

associating an ICAP server with an ICAP tag value, the ICAP tag value indicating a particular configuration of one or more ICAP services;

associating a local tag value with a data object of a plurality of data objects in an object store of the network cache, wherein the local tag value is equal to the ICAP tag value of the ICAP server at a time the data object was last processed by the ICAP server;

receiving a client request for the data object stored in the object store of the network cache;

determining that the local tag value of the data object is not equal to a current ICAP tag value of the ICAP server;

forwarding the data object from the object store of the network cache to the ICAP server to be re-processed, the ICAP server returning an unmodified version of the data object or a transformed version of the data object;

updating, in response to returning the unmodified version of the data object, the local tag value of the data object to equal the current tag value of the ICAP server; and forwarding the data object to the client.

35. A method for improving object cacheability using Internet Content Adaptation Protocol (ICAP), comprising:

operatively interconnecting an ICAP configured network cache with an origin server via a network;

associating an ICAP server with an ICAP tag value, the ICAP tag value indicating a particular configuration of one or more ICAP services;

associating a local tag value with a data object in an object store of the network cache, wherein the local tag value is equal to the ICAP tag value of the ICAP server at a time when the data object was last processed by the ICAP server;

determining that the local tag value of the data object is not equal to a current ICAP tag value of the ICAP server;

forwarding the data object from the object store of the network cache to the ICAP server to be re-processed, the ICAP server returning an unmodified version of the data object or a transformed version of the data object;

invalidating, in response to the ICAP server returning the transformed version, the data object in the object store of the network cache and replacing the data object with the transformed version; and returning the transformed version to the client, wherein the local tag value associated with the transformed version of the data object is equal to a new current tag value of the ICAP server, and wherein the new current tag value is determined at a time when the transformed version of the data object was processed by the ICAP server.

36. A method for improving object cacheability using Internet Content Adaptation Protocol (ICAP), comprising:

operatively interconnecting an ICAP configured network cache with an origin server via a network;

storing one or more data objects from the origin server to the network cache;

receiving a request for a client-requested data object stored in the network cache;

determining whether a configuration identifier at an ICAP server has changed since a last time that the client-requested data object was processed by the ICAP server, wherein the configuration identifier specifies a particular configuration of one or more ICAP services; and forwarding, in response to determining that the configuration identifier at the ICAP server has changed, the client-requested data object from the network cache to the ICAP server to be re-processed by the ICAP server.

* * * * *

UNITED STATES PATENT AND TRADEMARK OFFICE
CERTIFICATE OF CORRECTION

PATENT NO.        : 7,647,417 B1                                          Page 1 of 1
APPLICATION NO.   : 11/376439
DATED             : January 12, 2010
INVENTOR(S)       : Manik Taneja It is certified that error appears in the above-identified patent and that said Letters Patent is hereby corrected as shown below:

Col. 9, Line 59, please amend as shown:

also may be called on by the client-request thread 283 to [[is]]

Col. 19, Line 11, please amend as shown:

response to the local tag value of the [[requested]] data

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,647,417 B1  Page 1 of 1
APPLICATION NO. : 11/376439
DATED : January 12, 2010
INVENTOR(S) : Manik Taneja It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 671 days.

Signed and Sealed this

Sixteenth Day of November, 2010

David J. Kappos
*Director of the United States Patent and Trademark Office*